United States Patent
Oh

(10) Patent No.: US 6,226,049 B1
(45) Date of Patent: May 1, 2001

(54) NTSC REJECTION FILTER

(75) Inventor: Ji-sung Oh, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/961,804

(22) Filed: Oct. 31, 1997

(30) Foreign Application Priority Data

Mar. 25, 1997 (KR) .................................................. 97-10379

(51) Int. Cl.⁷ ................................ H04N 5/21; H04N 5/38
(52) U.S. Cl. .......................... 348/607; 348/607; 348/614; 348/625; 348/21; 375/346; 375/348; 375/350; 375/265; 364/724.11; 364/724.19
(58) Field of Search .................................... 348/607, 625, 348/21, 614; 375/346, 348, 350, 265, 254; 364/724.11, 724.19

(56) References Cited

U.S. PATENT DOCUMENTS

| | | | |
|---|---|---|---|
| 5,548,617 | * 8/1996 | Patel et al. | 375/316 |
| 5,550,596 | * 8/1996 | Strolle et al. | 348/607 |
| 5,559,561 | * 9/1996 | Wei | 348/470 |
| 5,592,235 | * 1/1997 | Park et al. | 348/555 |
| 5,602,583 | * 2/1997 | Citta | 348/21 |
| 5,606,579 | * 2/1997 | Patel et al. | 375/321 |
| 5,731,848 | * 3/1998 | Patel et al. | 348/614 |
| 5,748,226 | * 5/1998 | Limberg | 348/21 |
| 5,757,684 | * 5/1998 | Zaugg | 364/724.19 |
| 5,821,988 | * 10/1998 | Citta et al. | 348/21 |
| 5,841,484 | * 11/1998 | Hulyalkar et al. | 348/607 |
| 5,872,815 | * 2/1999 | Stolle et al. | 375/321 |

* cited by examiner

Primary Examiner—John Peng
Assistant Examiner—Paulos Natnael
(74) Attorney, Agent, or Firm—Sughrue, Mion, Zinn, Macpeak & Seas, PLLC

(57) ABSTRACT

A receiver including an NTSC rejection filter for eliminating interference signals from a high definition signal. The ratio of the energy of an expected high definition signal to the energy of an NTSC signal is determined. An NTSC signal sequence is generated according to the determined ratio. The number of filter taps is determined, and an autocorrelation matrix of the NTSC signal is calculated using the generated NTSC signal sequence. The power of all interference noise in the output of the NTSC rejection filter is used as a cost function, with respect to the input NTSC interference signal, the additive Gaussian noise and the VSB signal. A filter coefficient equation, for minimizing the cost function, is obtained by differentiation, and then the autocorrelation matrix is substituted for the equation, to calculate coefficients of the NTSC rejection filter.

17 Claims, 6 Drawing Sheets

NTSC REJECTION FILTER

BACKGROUND OF THE INVENTION

The present invention relates to a receiver for receiving a high definition signal, and, more particularly, to a receiver employing an NTSC rejection filter for eliminating noise and other interference from the high definition signal.

In the United States, a test has been conducted of the Grand Alliance Advanced Television (GA-ATV) system for digital television transmission. GA-ATV is a new television standard capable of replacing NTSC. The GA-ATV system (also referred to as a GA-HDTV or GA-VSB system) standardized by the Advanced Television System Committee (ATSC) employs vestigial sideband (VSB) modulation for digital transmission. For this modulation, 8-VSB using eight levels is selected for a terrestrial broadcast mode and 16-VSB using sixteen levels is selected for a high speed cable mode.

A new ATV signal is simultaneously transmitted with a conventional analog television signal (NTSC) through a television channel which is not used in a given geographic area (a so-called 'taboo channel'). Accordingly, the GA-VSB receiver must be designed to be robust in the presence of NTSC co-channel interference.

Meanwhile, a comb filter is proposed by the ATSC standard as an NTSC co-channel interference rejection filter (NTSC rejection filter). The comb filter is employed in a GA-VSB receiver (see FIG. 1), and disclosed in "Grand Alliance HDTV System Specification," submitted to the ACATS Technical Subgroup, Feb. 1994.

When the NTSC signal is present in the HDTV channel, the NTSC signal acts as interference. In order to reduce this interference, the receiver of the GA-VSB system removes a modulation carrier of the NTSC signal, using an NTSC rejection filter 112, including the comb filter.

FIGS. 2A and 2B show the structure of the comb filter and frequency characteristics thereof, respectively. In a co-channel where the VSB signal and the NTSC signal are simultaneously broadcast, there is a constant carrier frequency offset, approximately 0.89 MHz between the NTSC signal and the VSB signal. The NTSC signal is modulated by a frequency as high as the frequency offset from the standpoint of judging from the baseband region. Most of the energy of the NTSC signal is concentrated in an original DC component, (i.e., a modulation carrier). Accordingly, as shown in FIG. 2A, in a subtracter 132 of the comb filter, a symbol output from a 12 symbol delay 130 is subtracted from an input symbol, to remove the modulation carrier component, which reduces the amount of interference caused by the NTSC signal.

The comb filter, as shown in FIG. 2B, has six frequency notches in an HDTV signal band, that is, a VSB of 6 MHz. Most of the energy of the NTSC signal acting as an interference signal in the HDTV signal is concentrated in a visual carrier (V), a chrominance subcarrier (C), and an aural carrier (A). However, the carriers are each positioned around a frequency notch of the comb filter, so that the energy of the NTSC signal passing through the comb filter is greatly reduced. Accordingly, the comb filter has a simple structure that significantly rejects the NTSC interference signal.

However, although the comb filter proposed by the ATSC standard significantly rejects the NTSC interference signal, it changes the number of output levels of the filtered signal received from an A/D converter 108. That is, due to a partial response characteristic of the comb filter, the number of levels of the signal passing through the comb filter increases from 8 levels {±7, ±5, ±3, and ±1} at the input to 15 levels {±14, ±12, ±10, ±8, ±6, ±4, ±2, and 0} at the output. The operation of the comb filter involves the subtraction of two signals having full gain. Accordingly, a signal of 8 levels increases to 15 levels, and, at the same time, the power of the additive Gaussian noise increases by 3 dB so that the signal to noise ratio (SNR) decreases by 3 dB, while the signal passes through the comb filter.

Also, the design of the TCM (trellis code modulation) decoder 122 must consider the delay caused by the comb filter. Accordingly, when the comb filter is used in the receiver, the TCM decoder 122 must act as an 8-state decoder instead of a 4-state. Therefore, the TCM decoder 122 must include both an 8-state trellis decoder and a 4-state trellis decoder.

As described above, in the case that the comb filter is used for rejecting NTSC interference, an 8-state trellis decoder appropriate for a signal of 15 levels requires a structure more complicated than that of the 4-state trellis decoder. This leads to complex hardware, and degrades the performance of the receiving system due to SNR loss.

However, in order to constrain amplification of white noise to a specified value of 0.3 dB (unlike noise amplification of 3 dB caused by the comb filter) and to minimize NTSC interference, a new GA system using an FIR filter in the transmitter and receiver was proposed. See, International Workshop on HDTV, "A New NTSC Co-Channel Interference Rejection Filter with Coded 6-VSB Modulation for Improved ATV Coverage," by Samir N. Hulyalkar et al., Oct. 8–9, 1996. The GA system proposed in this reference is a new system using a 6-VSB modulation method. The FIR filter is used as a precoder in the transmitter and as an NTSC rejection filter in the receiver, and since the same filter coefficient must be used in both the receiver and the transmitter, the FIR filter cannot apply to the current GA system.

SUMMARY OF THE INVENTION

To solve the above problem, it is an object of the present invention to provide an NTSC rejection filter having reduced noise amplification without changing the number of levels of the signal which passes through the NTSC rejection filter.

It is another object of the present invention to provide a receiver which does not require an extra trellis-decoder corresponding to the change of the number of levels, since the number of levels of the signal which passes through the NTSC rejection filter in a GA-VSB receiver is maintained constant, to thereby simplify hardware and reduce cost.

To accomplish the above and other objects, there is provided a method for use in an NTSC rejection filter for removing NTSC signals in a high definition signal. The method includes the steps of: (a) determining an energy ratio of energy of an expected high definition signal to energy of an input NTSC signal, (b) generating an NTSC signal sequence according to the energy ratio, (C) obtaining an autocorrelation matrix of the input NTSC signal, using the NTSC signal sequence as follows:

$$R_I = \begin{bmatrix} a & b^T \\ b & c \end{bmatrix}$$

where: '$R_I$' represents an autocorrelation matrix of the NTSC signal with a predetermined number 'N' of filter taps, 'a' is the energy of the NTSC signal, 'b' indicates a 1×N vector, 'b$^T$' indicates the matrix transpose of 'b', and 'C' indicates an N×N matrix, and (d) calculating filter coefficients based on the autocorrelation matrix, where the coefficient 'g' of the filter is obtained by the following equation:

$$g=-(C+(N_0+E_s)I)^{-1}b,$$

where: 'N$_0$' represents the power of Gaussian noise input to the NTSC rejection filter, 'E$_s$' indicates the mean power of the input high definition signal, and 'I' indicates a unit matrix.

To accomplish yet other objects of the present invention, there is provided a receiver for receiving a high definition signal having a predetermined number of levels, including a tuner for converting a high definition signal to an intermediate frequency (IF) signal of a predetermined frequency, a frequency and phase locked loop (FPLL) circuit for recovering a carrier from the IF signal, multiplying the carrier by the IF signal to produce a demodulated baseband signal, an analog-digital (A/D) converter for sampling the output of the FPLL circuit to convert the sampled output to digital data according to a sampling clock, an NTSC rejection filter including a finite impulse response (FIR) filter, being operative to remove carrier components of the NTSC signal from the output of the A/D converter, an equalizer for equalizing the output of the NTSC rejection filter, a first decoder including one type of trellis decoder and for trellis-decoding the output of the equalizer, and a second decoder for processing the trellis-decoded data for detecting and correcting errors, wherein the number of levels of the signal passing the through NTSC rejection filter is maintained constant.

To accomplish even further objects of the present invention, there is provided a receiver for receiving a high definition signal having a predetermined number of levels, including: a tuner for converting a high definition signal to an IF signal of a predetermined frequency, A/D converter for converting the IF signal to digital data, a digital frequency and phase locked loop (FPLL) circuit for recovering a carrier using a pilot signal included in the data output from the A/D converter, multiplying the carrier by the output of the A/D converter to recover baseband data, a matching filter for controlling a symbol rate of the data output by the FPLL circuit, an NTSC rejection filter including an FIR filter, being operative to remove carrier components of the NTSC signal from an output of the matching filter, an equalizer for equalizing the output of the NTSC rejection filter, a first decoder including a trellis decoder for trellis-decoding an output of the equalizer, and a second decoder for processing the trellis-decoded data to detect and correct errors within the trellis-decoded data, wherein the number of levels of the signal passing through the NTSC rejection filter is maintained constant.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, an NTSC rejection filter which does not change the number of signal levels, and preferred embodiments of a receiver employing the same, will be described with reference to the accompanying drawings.

Figure 3:
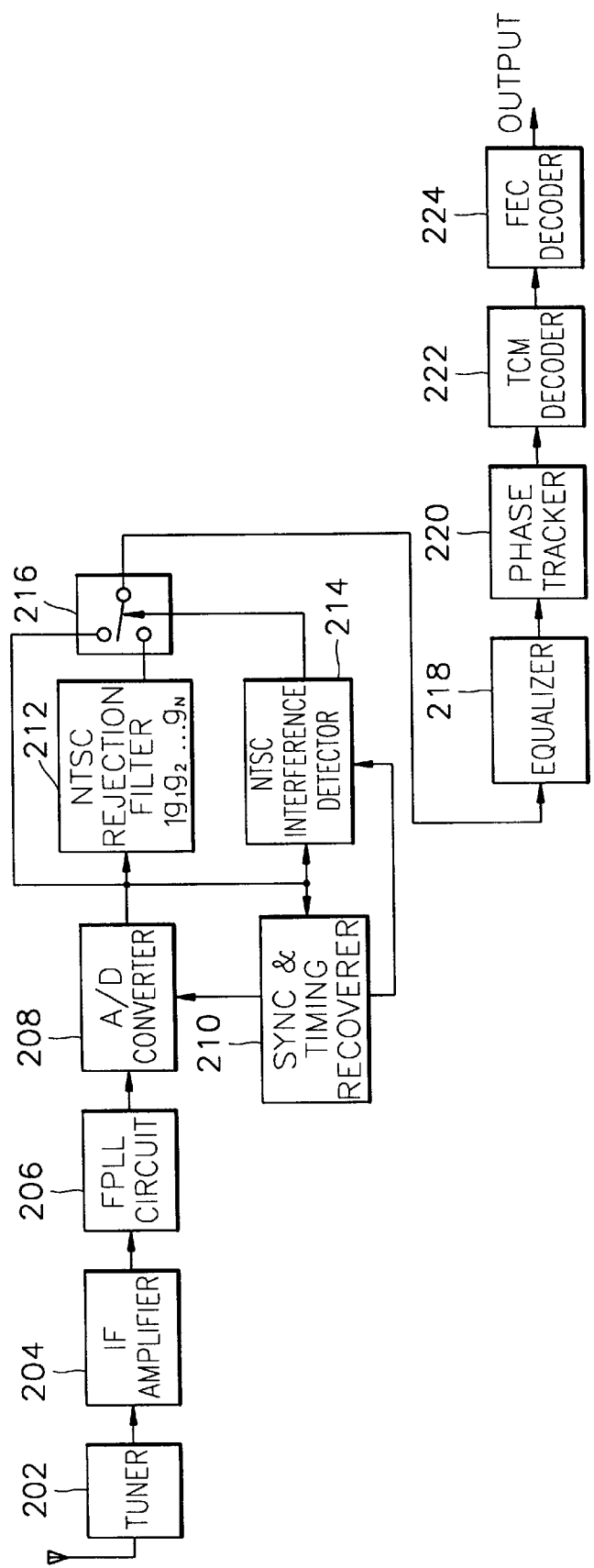
FIG. 3 is a block diagram of a receiver employing an NTSC rejection filter according to one embodiment of the present invention.

Referring to FIG. 3, a VSB signal received from an antenna is converted by a tuner 202 to a predetermined intermediate frequency (IF) signal. An IF amplifier 204 controls the amplitude of the IF signal according to an automatic gain control signal (not shown). A carrier is recovered by a frequency and phase locked loop (FPLL) circuit 206, and a pilot signal included in the output signal of the IF amplifier 204 is tracked, to control a local oscillating frequency of the tuner 202 such that the pilot signal exists at 0 Hz. Therefore, in the FPLL circuit 206, the carrier is recovered, and the recovered carrier is multiplied to the output of the IF amplifier 204, to demodulate the result as a baseband signal. In an A/D converter 208, the output of the FPLL circuit 206 is sampled and converted to digital data according to symbol clock recovered in a synchronization (sync) and timing recoverer 210. In the sync and timing recoverer 210, a sampling timing point of the A/D converter 208 is predicted, and a field sync reference signal stored in the sync and timing recoverer 210 is compared to a field sync signal sequence transmitted in each field, to recover the field sync signal sequence. Additionally, a VSB data frame includes two fields, each having one field sync segment and 312 data segments. Also, the data segment includes a segment sync of 4 symbols, and 828 data symbols. At this time, the segment sync is inserted into an 8-level digital data stream, at the front of the field sync segment and each of the data segments, respectively.

The NTSC rejection filter 212 includes an FIR filter for preventing a VSB signal from being deteriorated by an NTSC signal which is simultaneously broadcasted with the VSB signal, in a co-channel state. The output of the filter is maintained at 8 levels without increasing the number of the levels. In an NTSC interference detector 214, the field sync reference signal stored in the sync and timing recoverer 210 is compared to the field sync signal sequence output from the A/D converter 208. By integrating the square of the difference between field sync reference signal output by the recoverer 210 and the field sync signal sequence output by the A/D converter 208, the NTSC interference detector 214 detects whether an NTSC signal is interfering with the VSB signal, and outputs a detection signal accordingly.

A selector 216 includes a multiplexer, and selects the output of the NTSC rejection filter 212 or the output of the A/D converter 208 which has not passed through the NTSC rejection filter 212, according to the detection signal output by the NTSC interference detector 214. An equalizer 218 removes multipath distortion generated while the transmitted signal passes through a transmission channel. The multipath distortion is generated in a terrestrial broadcast due to wave reflection from mountains, groups of buildings or airplanes, and the like. The phase tracker 220 removes phase noise caused by a phase error, which is not removed by the FPLL circuit 206.

Since the number of levels of the output signal of the NTSC rejection filter 212 is maintained constant, a TCM decoder 222 includes only a 4-state trellis decoder without having an 8-state trellis decoder, so that the signal output from the phase tracker 220 is decoded by the 4-state trellis decoder, regardless of whether it has passed through the NTSC rejection filter 212. A forward error correction (FEC) decoder 224 deinterleaves the trellis-decoded data, and the deinterleaved data is error-correction-decoded, and then de-randomized to be output.

Figure 4:
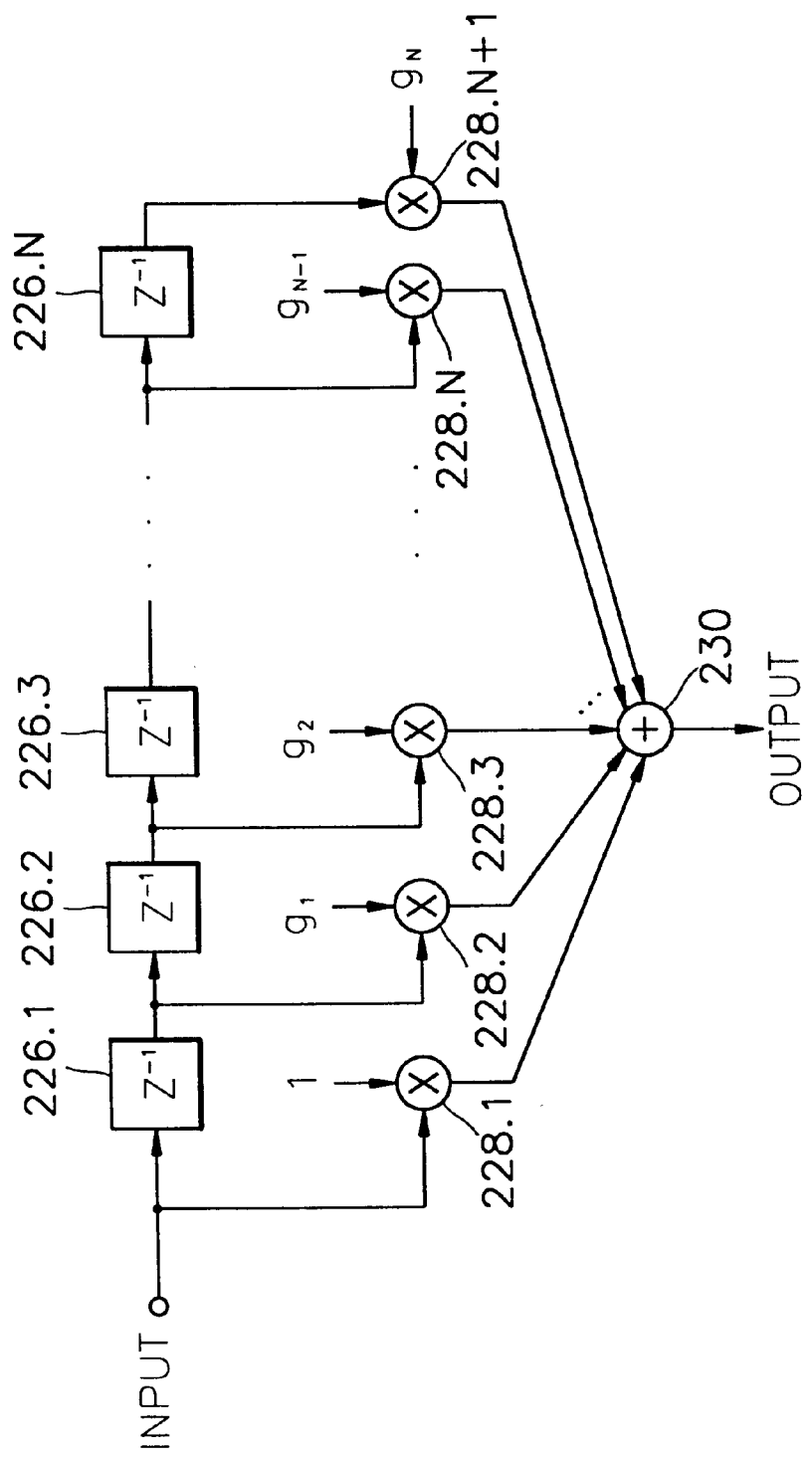
FIG. 4 shows the structure of the NTSC rejection filter of FIG. 3.

According to the present invention, the NTSC rejection filter, which does not change the number of signal levels, employs a finite impulse response (FIR) filter, as shown in FIG. 4. In FIG. 4, the NTSC rejection filter includes an FIR filter including N delays 226.1~226.N, multipliers 228.1~228.N+1 and an adder 230. The N delays 226.1~226.N are connected in series with each other and have an input terminal connected to an output terminal of the A/D converter 208. The first multiplier 228 has a first input terminal connected to input terminal (or the output terminal of the A/D converter 208) and a second input terminal having a first tap coefficient of 1. The multipliers 228.2~228.N+1 have first input terminals connected to the output terminals of delays 226.1~226.N, respectively, and second input terminals having coefficients $g_1, \ldots, g_n$, respectively. The adder 230 adds the outputs of the multipliers 228.1~228.N+1. Here, $Z^{-1}$ indicates a unit delay. Accordingly, in the FIR filter of the NTSC rejection filter 212 according to the present invention, the filter coefficients are $[1, g_1, g_2, \ldots g_n]$, the first tap coefficient is 1, and the number of filter taps is N+1.

Figure 5:
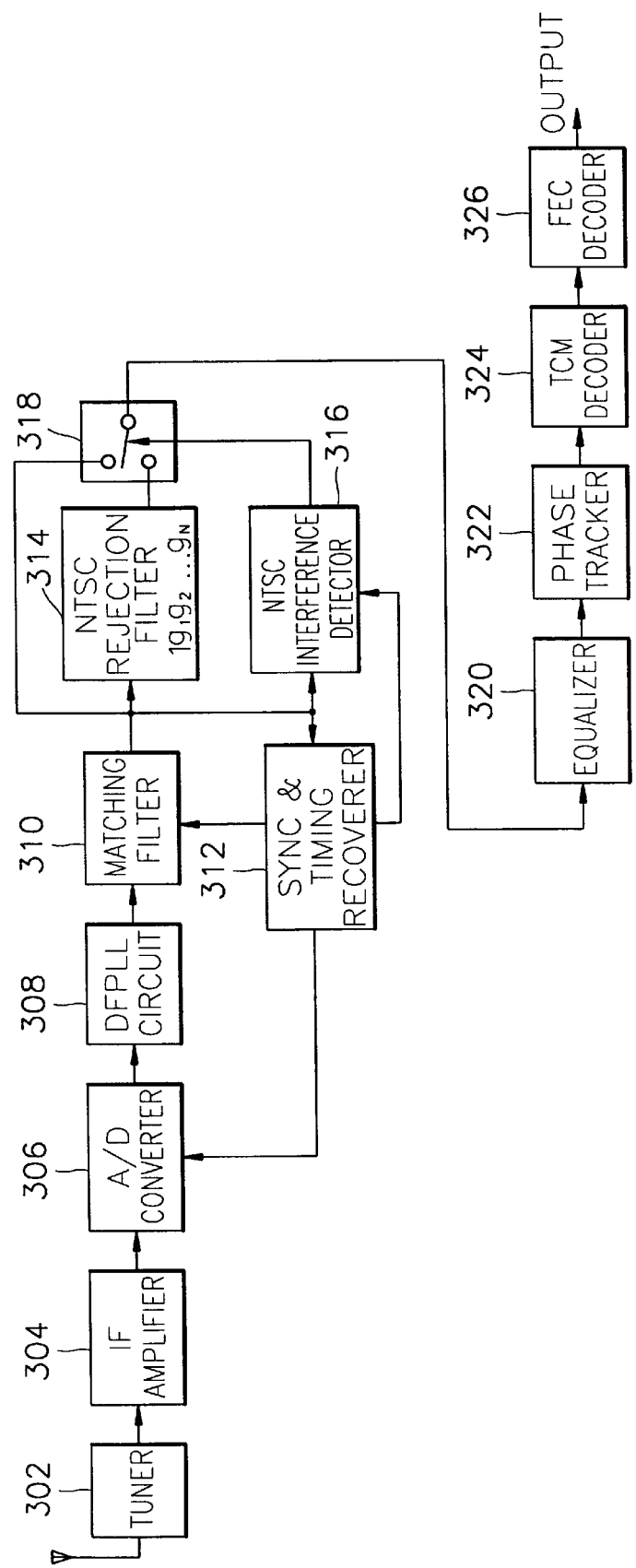
FIG. 5 is a block diagram of a receiver employing an NTSC rejection filter according to another embodiment of the present invention.

FIG. 5 is a block diagram of a GA-VSB receiver employing an NTSC rejection filter according to another embodiment of the present invention. In FIG. 5, a tuner 302 converts a VSB signal received from an antenna to an IF signal of a predetermined frequency. In an IF amplifier 304, the amplitude of the IF signal is controlled according to an automatic gain control signal (not shown), to maintain the input signal to an A/D converter 306 at a constant level.

In the A/D converter 306, an analog IF signal output from the IF amplifier 304 is converted to digital data according to a sampling clock. The frequency of the sampling clock is twice that of a symbol clock frequency (fs) supplied by a sync and timing recoverer 312. In a digital frequency and phase locked loop (DFPLL) circuit 308, a carrier is recovered using a pilot signal included in the data output by the A/D converter 306, and the recovered carrier is multiplied by the output of the A/D converter 306, to recover data of a baseband.

In a matching filter 310, a demodulated baseband signal is matched with the signal before transmission, to remove signal distortion and aliasing. That is, in the matching filter 310, the symbol rate of the data output from the DFPLL 308, is controlled by a symbol clock frequency, since the symbol rate of output thereof is 2×fs. In the sync and timing recoverer 312, the symbol clock is recovered from the output of the matching filter 310 to apply the sampling clock having a frequency of twice the symbol clock frequency to the A/D converter 306, and a segment sync and a field sync are detected from the output of the matching filter 310.

The NTSC rejection filter 314, as shown in FIG. 4, includes an FIR filter having filter coefficients $[1, g_1, g_2, \ldots, g_N]$. The FIR filter removes NTSC carrier elements from the output of the matching filter 310, maintaining 8 levels without increase in the number of the levels. The NTSC interference detector 316 compares a field sync reference signal stored in the sync and timing recoverer 312 with a field sync signal sequence output from the matching filter 310, and detects whether an NTSC signal is interfering with the VSB signal, to output a detection signal.

A selector 318, which includes a multiplexer, selects the output of the NTSC rejection filter 314, or the output of the matching filter 310, which has not passed through the NTSC rejection filter, according to the detection signal from the NTSC interference detector 316. An equalizer 320 renews coefficients of filter installed therein, using a training sequence inserted into a field sync segment, and then performs an equalization to remove multipath distortion. A phase tracker 322 removes a phase error which has not been removed by the DFPLL circuit 308.

A TCM decoder 324 includes a 4-state trellis decoder (without having an 8-state trellis decoder) for trellis-decoding the output of the phase tracker 322. A forward error correction (FEC) decoder 326 deinterleaves the trellis-decoded data, and the deinterleaved data is error-correction-decoded, de-randomized, and then output.

A method for designing an NTSC rejection filter which maintains the number of signal levels constant, according to the present invention will be described.

A conventional comb filter, as proposed by the ATSC, increases the number of signal levels. The structure of the trellis decoder is complicated by the increased number of levels of the output signal of the comb filter, and either a 4-state or an 8-state trellis decoder must be selected depending on the presence of NTSC interference. Therefore, in order to simplify the structure of the receiver, an NTSC rejection filter which does not increase the number of levels is required.

That is, a conventional comb filter increases the number of levels, due to a partial response characteristic. Therefore, in order to prevent the number of levels from increasing, the number of taps of the NTSC rejection filter is increased. A conventional number of levels is maintained by the first tap coefficient of 1, and the performance of the interference signal rejection is similar to that of the conventional comb filter.

Figure 1:
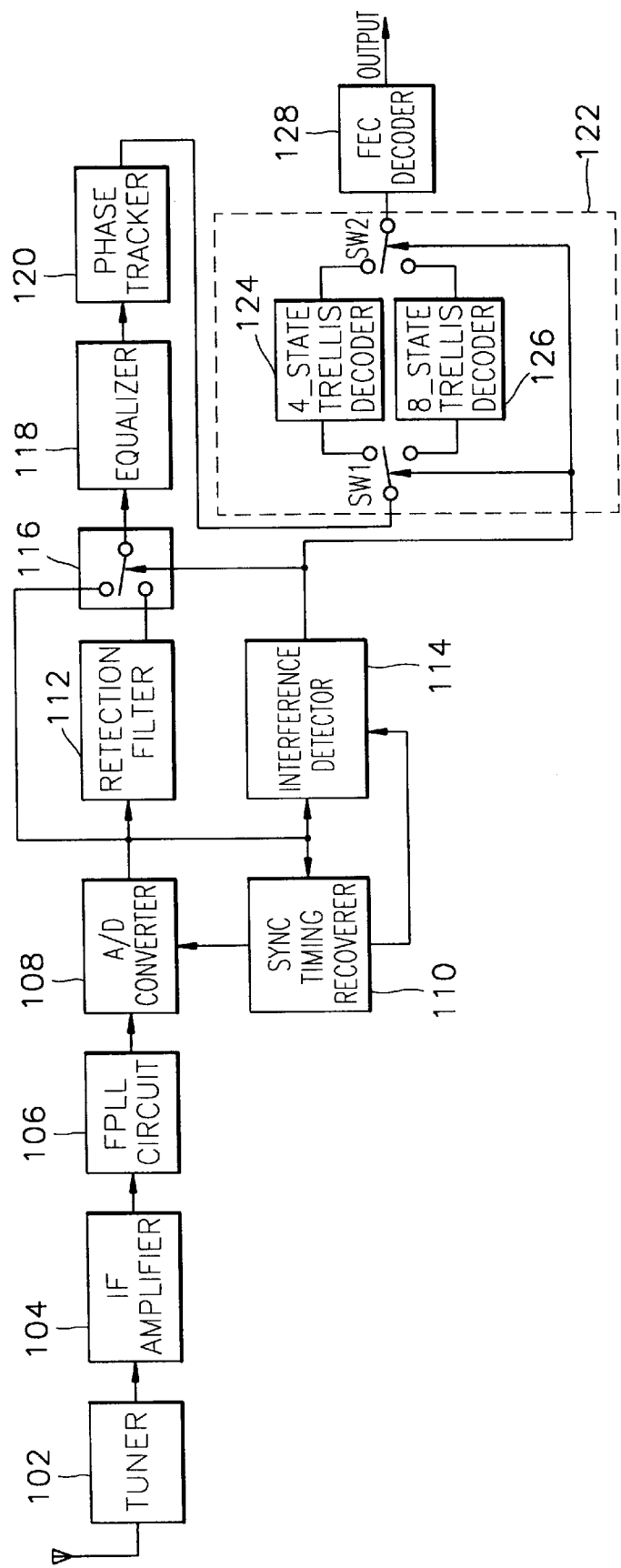
FIG. 1 is a block diagram of a VSB receiver employing a conventional NTSC rejection filter.
Figure 2A:
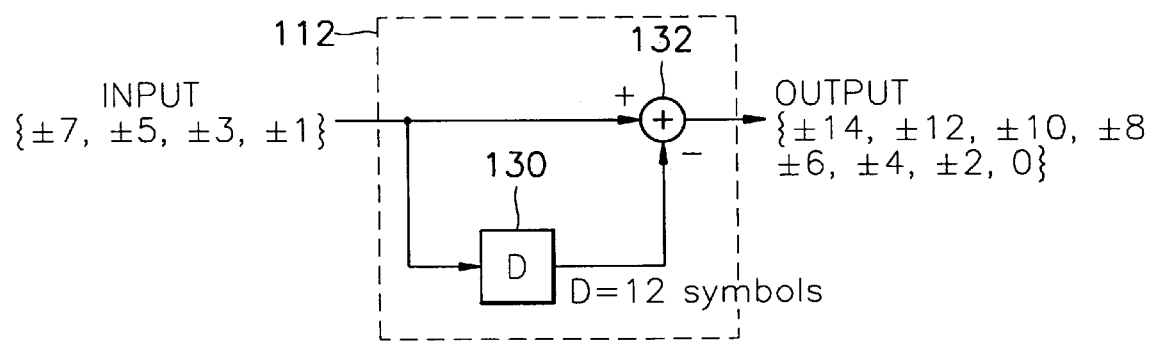
FIGS. 2A and 2B illustrate the structure of the NTSC rejection filter of FIG. 1 and the frequency characteristics thereof.
Figure 2B:
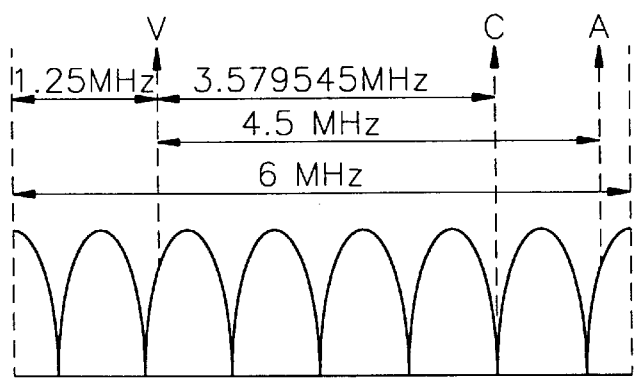

Also, as shown in FIG. 2B, the comb filter has not only notches at the positions of each of three carriers of the NTSC signal but also three other notches, to thereby markedly amplify noise. Accordingly, the output of the comb filter is noise amplified by approximately 3 dB. According to the present invention, the amplification of noise is constrained and the coefficients of the NTSC rejection filter are determined such that the frequency response is constant, except in a region where each carrier of the NTSC signal is positioned.

Also, once the number of filter taps and the NTSC signal sequence acting as an interference signal have been preset, the value of the filter tap coefficients can be determined.

Figure 6:
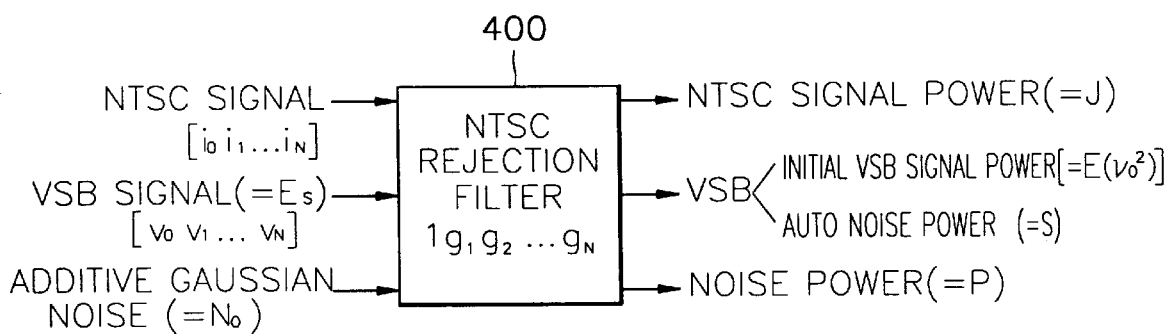
FIG. 6 shows the input/output signals of the NTSC rejection filter according to the present invention.

FIG. 6 shows input and output signals of the NTSC rejection filter according to the present invention. In FIG. 6, signals input to the NTSC rejection filter 400 are VSB signal, NTSC signal and additive Gaussian noise, where the power of the received Gaussian noise is $N_0$, and the mean power of the received VSB signal is $E_s$. The output signals of the NTSC rejection filter 400 are VSB signal, NTSC signal and noise, where the power of the NTSC signal output from the NTSC rejection filter 400 is 'J', and the output VSB signal includes power ($E(v_0)^2$) of an initial VSB signal and auto noise power 'S'. At this time, the power of the output noise is 'P'. In the NTSC rejection filter of the present invention, the filter coefficients are set to minimize the power of an interference signal included in the output signal, i.e., to minimize the summation value of the NTSC signal power 'J', the auto noise power 'S' and the noise power 'P'.

Figure 7:
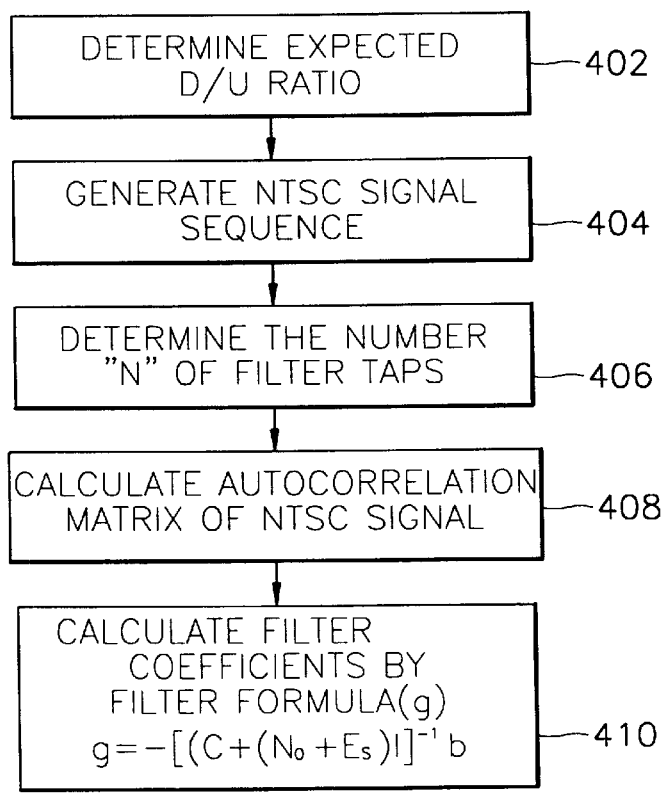
FIG. 7 is an operational flow chart operation of an NTSC rejection filter according to the present invention.

A flowchart representing the design method of the NTSC rejection filter according to the present invention is shown in FIG. 7, and will be described with reference to FIG. 6.

In FIG. 7, an energy ratio (D/U) of an expected VSB signal and an NTSC signal, that is, the ratio of the energy of a desired signal 'D' to that of an undesired signal 'U', is determined (step 402). The 'D/U' has a value of 2~3 dB.

An NTSC signal sequence is generated according to the value of the expected D/U (step 404). Here, the NTSC signal sequence is $[i_0, i_1, i_2, \ldots, i_N]$.

The number 'N' of filter taps are determined in order to maintain performance of removing the interference signal similar to the comb filter (step 406).

An autocorrelation matrix of the NTSC signal is calculated using the generated NTSC signal sequence and the number of taps 'N' of the filter (step 408).

The autocorrelation matrix '$R_I$' of the input NTSC signal sequence $[i_0, i_1, \ldots, i_N]$ is expressed as follows:

$$R_I = \begin{bmatrix} a & b^T \\ b & c \end{bmatrix} \quad (1)$$

Here, reference character 'a' indicates an input NTSC signal energy, reference character 'b' indicates a 1×N vector, reference character '$b^T$' indicates the matrix transpose of 'b', and reference character 'C' indicates an N×N matrix.

The autocorrelation matrix '$R_I$' of the NTSC signal is calculated, and the filter coefficients are calculated 'N' (step 410). A manner of deriving the filter coefficients 'g' is as follows.

First, when the coefficient of the first tap of the NTSC rejection filter 400 is 1 and the total number of taps is '1+N', impulse response is $[1\ g]=[1, g_1, \ldots, g_N]$. At this time, the amplification 'A' of the output additive noise of the NTSC rejection filter 400 is the sum of the square of each filter coefficient of the NTSC rejection filter 400, as described in equation (2), and power 'P' of the output noise is described in equation (3) as follows:

$$A = 1 + g_1^2 + \ldots + g_N^2 \quad (2)$$
$$= 1 + [g_1 \ldots g_N] \begin{bmatrix} g_1 \\ \vdots \\ g_N \end{bmatrix}$$

$$P = (1 + g^T g) N_0 \quad (3)$$

Here, the reference character '$N_0$' is the power of input Gaussian noise input to the NTSC rejection filter 400.

However, the power 'J' of the NTSC signal output from the NTSC rejection filter 400 can be expressed by equation (4) as follows:

$$J = [1\ \ g^T] R_I \begin{bmatrix} 1 \\ g \end{bmatrix} = a + g^T b + b^T g + g^T Cg \quad (4)$$

The power 'J' of the NTSC signal which is the result of convolution and squaring the NTSC signal sequence $[i_0, i_1, \ldots, i_N]$ and the impulse response $[1\ g_1\ g_2 \ldots g_N]$ of the NTSC rejection filter, can also be expressed as follows:

Here, 'E' is a mean operator $$J = E[(i_0 + g_1 i_1 + \ldots + g_N i_N)^2] \quad (5)$$

$$= E\left[\left([1\ \ g^T]\begin{bmatrix} i_0 \\ \vdots \\ i_N \end{bmatrix}\right)^2\right]$$

$$= [1\ \ g^T] E\left[\begin{bmatrix} i_0 \\ \vdots \\ i_N \end{bmatrix}[i_0 \ldots i_N]\right]\begin{bmatrix} 1 \\ g \end{bmatrix}$$

$$= [1\ \ g^T] E\begin{bmatrix} i_0^2 \ldots i_0 i_N \\ \vdots \\ i_N i_0 \ldots i_N i \end{bmatrix}$$

$$= [1\ \ g^T]\begin{bmatrix} a & b^T \\ b & C \end{bmatrix}\begin{bmatrix} 1 \\ g \end{bmatrix}$$

$$= [a + g^T b b^T + g^T C]\begin{bmatrix} 1 \\ g \end{bmatrix}$$

$$= a + g^T b + b^T g + g^T Cg.$$

Meanwhile, when the input VSB sequence is $[v_0\ v]=[v_0, v_1, \ldots v_N]$, auto noise of the VSB signal of the NTSC rejection filter 400 corresponds to $v_0 + v_1 g_1 + \ldots + v_N g_N$ which results from the convolution of the VSB signal sequence $[v_0, v_1, \ldots, v_N]$ and an impulse response $[1\ g_1\ g_2 \ldots g_N]$ of the NTSC rejection filter. The auto noise power 'S' can be expressed by equation (6) as follows:

$$S = E[(g^T v)^2]$$
$$= E[(g^T v)(g^T v)T]$$
$$= g^T E[vv^T]g$$
$$= g^T E_s g$$
$$= E_s g^T g \quad (6)$$

Here, reference character '$E_s$' is the mean power of the input VSB signal. In equation (6), the auto noise power 'S' is proportional to the power '$E_s$' of the input VSB signal, and since power '$E_s$' of the input VSB signal is considerably higher than that of the additive noise power '$N_0$', the effect of the auto noise on the output signal of the NTSC rejection filter dominates that of the amplification of the additive noise. The power of the interference signal at the output of the NTSC rejection filter can be expressed as follows:

$$\phi = P + J + S = a + g^T b + b^T g + g^T Cg + (1 + g^T g) N_0 + E_s g^T g \quad (7)$$

Here, an equation for obtaining the tap coefficients 'g' of a rejection filter, in which the function of FIG. 7 is a cost function to minimize the output power ($\phi$) of an interference signal, can be obtained as follows:

$$\partial \phi / \partial g = b + b + 2Cg + N_0 + 2g + E_s 2g = 0$$
$$\Rightarrow g = -(C + (N_0 + E_s)I)^{-1} b \quad (8)$$

Here, reference character 'I' is a unit matrix.

As described above, the NTSC rejection filter 400 for minimizing the output power of the interference signal can be determined by the autocorrelation matrix '$R_I$' of the input NTSC signal and the input energy ratio D/U which is a ratio of '$E_s$' and '$N_0$'.

Accordingly, in an actual receiving system, since the power '$E_s$' can be 21 $(=(1^2+3^2+5^2+7^2)/4)$ based on the output levels of the A/D converter 208 of FIG. 3 and the matching filter 310 of FIG. 5, the NTSC signal sequence is generated according to the energy ratio (D/U) of the expected VSB and the NTSC signal. At this time when 'C' and 'b' of the autocorrelation matrix are obtained, the NTSC rejection filter can be designed according to 'g' of equation 7.

According to the present invention, the VSB signal is a high definition signal, and the NTSC signal is a conventional analog television signal acting as an interference of an HDTV channel. However, the invention is not limited to the illustrated embodiment.

As described above, the NTSC rejection filter according to the present invention, which is an FIR filter having no partial response characteristic, can effectively remove an NTSC interference signal without changing the number of signal levels. Also, according to the design method of the present invention, the power of all interference signals other than the power of a data signal (VSB signal) is minimized, in the output of the NTSC rejection filter, to thereby greatly lower the noise amplification.

Further, the receiver employing the NTSC rejection filter according to the design method of the present invention does not require a complicated 8-state trellis decoder, which allows a simple structure of the receiver and reduces total cost for the receiving system.

What is claimed is:

1. A method for use in an NTSC rejection filter for removing NTSC signals in a high definition signal, said method comprising the steps of:

(a) determining an energy ratio of energy of an expected high definition signal to energy of an input NTSC signal;

(b) generating an NTSC signal sequence according to said energy ratio;

(c) obtaining an autocorrelation matrix of the input NTSC signal, using said NTSC signal sequence as follows:

$$R_I = \begin{vmatrix} a & b^T \\ b & C \end{vmatrix}$$

where '$R_I$' represents an autocorrelation matrix of the NTSC signal with a predetermined number 'N' of filter taps, 'a' is the energy of the NTSC signal, 'b' indicates a 1×N vector, '$b^T$' indicates the matrix transpose of 'b', and 'C' indicates an N×N matrix;

(d) calculating filter coefficients based on the autocorrelation matrix, where the coefficient 'g' of the filter is obtained by the following equation:

$$g = -(C+(N_0+E_s)I)^{-1}b,$$

where: '$N_0$' represents the power of Gaussian noise input to an NTSC rejection filter, '$E_s$' indicates the mean power of the input high definition signal, and 'I' indicates a unit matrix;

(e) configuring the NTSC rejection filter based on said calculated filter coefficients; and (f) removing the NTSC signal from the high definition signal using the NTSC rejection filter configured as in step (e).

2. A method according to claim 1, wherein the step (d) comprises the sub-steps of:

(d1) obtaining power 'P' of noise output from said filter as follows:

$$P=(1+g^Tg)N_0;$$

(d2) obtaining power 'J' of an NTSC signal output from said filter as follows:

$$J = |1 \quad g^T| |R_I| \begin{vmatrix} 1 \\ g \end{vmatrix} = a + g^Tb + b^Tg + g^TCg$$

(d3) obtaining the power 'S' of auto noise of the high definition signal output from said filter as follows:

$$S=E_s g^T g$$

(d4) using said power 'P', 'J' and 'S' obtained from steps (d1), (d2) and d3) as a cost function to calculate power for all interference signals output by said filter;

(d5) differentiating the cost function to obtain the equation 'g'; and (d6) calculating filter coefficients 'g' from the equation 'g'.

3. A method according to claim 2, wherein in the step (a), the energy ratio is the ratio of the mean power of said high definition signal to said input NTSC signal, where the mean power of said high definition signal is determined and the mean power of said NTSC signal corresponds to 'a' of said autocorrelation matrix '$R_I$'.

4. A receiver for receiving a high definition signal having a predetermined number of levels, comprising:

a tuner for converting a high definition signal to an intermediate frequency (IF) signal of a predetermined frequency;

a frequency and phase locked loop (FPLL) circuit for recovering a carrier from the IF signal, multiplying the carrier by the IF signal to produce a demodulated baseband signal;

an analog-digital (A/D) converter for sampling the output of the FPLL circuit to convert the sampled output to digital data according to a sampling clock;

an NTSC rejection filter including a finite impulse response (FIR) filter, being operative to remove carrier components of the NTSC signal from the output of the A/D converter;

an equalizer for equalizing the output of the NTSC rejection filter;

a first decoder including one type of trellis decoder and for trellis-decoding the output of the equalizer; and a second decoder for processing the trellis-decoded data for detecting and correcting errors, wherein tap coefficients of the FIR filter of said NTSC rejection filter are selected so that the number of signal levels input to the NTSC rejection filter equals the number of signal levels output from the NTSC rejection filter during a period of operation of the NTSC rejection filter when a sync signal is not received by the NTSC rejection filter.

5. A receiver according to claim 4, wherein the tap coefficients of the FIR filter of said NTSC rejection filter are $(1 \; g_1 \; g_2 \; \ldots \; g_N)$, the first tap coefficient is 1, and the total number of tap coefficients is N+1.

6. A receiver for receiving a high definition signal having a predetermined number of levels, comprising:

a tuner for converting a high definition signal to an intermediate frequency (IF) signal of a predetermined frequency;

a frequency and phase locked loop (FPLL) circuit for recovering a carrier from the IF signal, multiplying the carrier by the IF signal to produce a demodulated baseband signal;

an analog-digital (A/D) converter for sampling the output of the FPLL circuit to convert the sampled output to digital data according to a sampling clock;

an NTSC rejection filter including a finite impulse response (FIR) filter, being operative to remove carrier components of the NTSC signal from the output of the A/D converter;

an equalizer for equalizing the output of the NTSC rejection filter;

a first decoder including one type of trellis decoder and for trellis-decoding the output of the equalizer; and a second decoder for processing the trellis-decoded data for detecting and correcting errors, wherein tap coefficients of the FIR filter of said NTSC rejection filter are selected so that the number of signal levels input to the NTSC rejection filter equals the number of signal levels output from the NTSC rejection filter, wherein the tap coefficients of the FIR filter of said NTSC rejection filter are, the first tap coefficient is 1, and the total number of tap coefficients is N+1, and wherein one of the tap coefficients of said filter is obtained as follows:

$$g = -(C+(N_0+E_s)I)^{-1}b,$$

where: '$N_0$' represents the power of the Gaussian noise input to the NTSC rejection filter, '$E_s$' represents the mean power of an input high definition signal, 'I' represents a unit matrix, 'C' and 'b' are obtained from an autocorrelation matrix '$R_I$' of the input NTSC signal, and $$R_I = \begin{vmatrix} a & b^T \\ b & C \end{vmatrix}$$

where 'a' indicates the energy of the input NTSC signal, 'b' indicates a 1×N vector, '$b^T$' indicates the matrix transpose of 'b', and 'C' indicates an N×N matrix.

7. A receiver for receiving a high definition signal having a predetermined number of levels, comprising:

a tuner for converting a high definition signal to an IF signal of a predetermined frequency;

A/D converter for converting said IF signal to digital data;

a digital frequency and phase locked loop (FPLL) circuit for recovering a carrier using a pilot signal included in the data output from said A/D converter, multiplying said carrier by the output of said A/D converter to recover baseband data;

a matching filter for controlling a symbol rate of the data output by said FPLL circuit;

an NTSC rejection filter including an FIR filter, being operative to remove carrier components of the NTSC signal from an output of said matching filter;

an equalizer for equalizing the output of said NTSC rejection filter;

a first decoder including a trellis decoder for trellis-decoding an output of said equalizer; and a second decoder for processing the trellis-decoded data to detect and correct errors within the trellis-decoded data, wherein the number of levels of the signal passing through said NTSC rejection filter is maintained constant during a period of operation of said NTSC rejection filter when a sync signal is not received by the NTSC rejection filter.

8. A receiver according to claim 7, wherein said NTSC rejection filter is a FIR filter in which the filter taps are (1 $g_1$ $g_2$ ... $g_N$), the first tap coefficient is 1, and the total number of filter taps is N+1.

9. A receiver for receiving a high definition signal having a predetermined number of levels, comprising:

a tuner for converting a high definition signal to an IF signal of a predetermined frequency;

A/D converter for converting said IF signal to digital data;

a digital frequency and phase locked loop (FPLL) circuit for recovering a carrier using a pilot signal included in the data output from said A/D converter, multiplying said carrier by the output of said A/D converter to recover baseband data;

a matching filter for controlling a symbol rate of the data output by said FPLL circuit;

an NTSC rejection filter including an FIR filter, being operative to remove carrier components of the NTSC signal from an output of said matching filter;

an equalizer for equalizing the output of said NTSC rejection filter;

a first decoder including a trellis decoder for trellis-decoding an output of said equalizer; and a second decoder for processing the trellis-decoded data to detect and correct errors within the trellis-decoded data, wherein the number of levels of the signal passing through said NTSC rejection filter is maintained constant, wherein said NTSC rejection filter is a FIR filter in which the filter taps are (1 $g_1$ $g_2$ ... $g_N$), the first tap coefficient is 1, and the total number of filter taps is N+1, and wherein a coefficient of said filter is obtained as follows:

$$g = -(C+(N_0+E_s)I)^{-1}b,$$

where: '$N_0$' indicates the power of the Gaussian noise input to said NTSC rejection filter, '$E_s$' indicates the mean power of an input high definition signal, 'I' indicates a unit matrix, 'C' and 'b' are obtained from an autocorrelation matrix '$R_I$' of the input NTSC signal, and $$R_I = \begin{vmatrix} a & b^T \\ b & C \end{vmatrix}$$

where 'a' indicates the energy of the input NTSC signal, 'b' indicates a 1×N vector, reference character '$b^T$' indicates the matrix transpose of 'b', and 'C' indicates an N×N matrix.

10. A receiver according to claim 4, wherein the number of tap coefficients determines the number of signal levels output from the NTSC rejection filter.

11. A receiver for receiving a high definition signal having a predetermined number of levels, comprising:

a tuner for converting a high definition signal to an intermediate frequency (IF) signal of a predetermined frequency;

a frequency and phase locked loop (FPLL) circuit for recovering a carrier from the IF signal, multiplying the carrier by the IF signal to produce a demodulated baseband signal;

an analog-digital (A/D) converter for sampling the output of the FPLL circuit to convert the sampled output to digital data according to a sampling clock;

an NTSC rejection filter including a finite impulse response (FIR) filter, being operative to remove carrier components of the NTSC signal from the output of the A/D converter;

an equalizer for equalizing the output of the NTSC rejection filter;

a first decoder including one type of trellis decoder and for trellis-decoding the output of the equalizer; and a second decoder for processing the trellis-decoded data for detecting and correcting errors, wherein the number of levels of the signal passing through the NTSC rejection filter is maintained constant;

wherein the NTSC rejection filter is a FIR filter in which the filter taps are $[1\ g_1\ g_2 \ldots g_N]$, the first tap coefficient is 1, and the total number of filter taps is N+1;

wherein the coefficient of said filter is obtained as follows:

$$g = -(C+(N_0+E_s)I)^{-1}b,$$

where: '$N_0$' represents the power of the Gaussian noise input to the NTSC rejection filter, '$E_s$' represents the mean power of an input high definition signal, 'I' represents a unit matrix, 'C' and 'b' are obtained from an autocorrelation matrix '$R_I$' of the input NTSC signal, and $$R_I = \begin{vmatrix} a & b^T \\ b & C \end{vmatrix}$$

where 'a' indicates the energy of the input NTSC signal, 'b' indicates a 1×N vector, '$b^T$' indicates the matrix transpose of 'b', and 'C' indicates an N×N matrix.

12. A method for use in an NTSC rejection filter for removing NTSC signals in a high definition signal, said method comprising the steps of:

receiving a high definition signal, which includes an NTSC signal;

inputting a digital data sequence derived from the high definition signal into an NTSC rejection filter which removes the NTSC signal, wherein the digital data sequence has a first number of signal levels, and wherein the NTSC rejection filter includes a finite impulse response (FIR) filter; and outputting a signal, which represents the high definition signal and has a second number of signal levels, from the NTSC rejection filter, wherein the first number of signal levels is equal to the second number of signal levels during a period of operation of the NTSC rejection filter when a sync signal is not received by the NTSC rejection filter.

13. A method according to claim 12, wherein tap coefficients of the FIR filter of said NTSC rejection filter are selected so that the first number of signal levels is equal to the second number of signal levels.

14. A method according to claim 13, wherein the number of the tap coefficients determines the second number of signal levels.

15. An NTSC rejection filter, being operative to remove carrier components of an NTSC signal from digital data input to the NTSC rejection filter, comprising:

a finite impulse response (FIR) filter which removes the carrier components of an NTSC signal, wherein the number of signal levels input to the NTSC rejection filter equals the number of signal levels output from the NTSC rejection filter during a period of operation of the NTSC rejection filter when a sync signal is not received by the NTSC rejection filter, and said digital data is derived from a high definition signal which includes the carrier components of the NTSC signal.

16. An NTSC rejection filter according to claim 15, wherein the FIR filter has tap coefficients selected so that the number of signal levels input to the NTSC rejection filter equals the number of signal levels output from the NTSC rejection filter.

17. An NTSC rejection filter according to claim 16, wherein the number of the tap coefficients determines the number of output levels.

* * * * *